United States Patent [19]

Hakansson

[11] 3,908,443

[45] Sept. 30, 1975

[54] METHOD AND A DEVICE FOR DETECTING CONTAMINANTS IN PROCESS WATER

[75] Inventor: Erik Hakansson, Landskrona, Sweden

[73] Assignee: Gotaverkin Oresundsvarvet AB, Landskrona, Sweden

[22] Filed: Mar. 6, 1974

[21] Appl. No.: 448,747

[30] Foreign Application Priority Data
Mar. 7, 1973 Sweden.......................... 7303163-5

[52] U.S. Cl.............................................. 73/61.1 R
[51] Int. Cl.².......................................... G01N 33/18
[58] Field of Search........ 73/61.1 R, 61 R, 53, 15 R, 73/19, 29; 210/71, 85, 86; 23/230 M, 230 PC, 253 PC

[56] References Cited
UNITED STATES PATENTS
3,753,654   8/1973   Eggertsen ........................ 23/230 PC 3,814,583   6/1974   Miller et al. ................ 23/230 PC X FOREIGN PATENTS OR APPLICATIONS
7,005,880  10/1970   Netherlands..................... 73/61.1 R Primary Examiner—Richard C. Queisser
Assistant Examiner—Joseph W. Roskos
Attorney, Agent, or Firm—Holman & Stern

[57] ABSTRACT

Contaminants in process water are detected by continuously dividing off a fraction of the water, subjecting this fraction to a settling action, preferably in at least two steps collecting a batch of residue so obtained in a receiver and transferring this batch first dropwise and finally suddenly to a heating means enclosed in a chamber, which is connected to a gas detector. This will not react to pure steam, so if the batch contains water only nothing will happen. If there is for instance oil mixed with the water the detector will react. The point during this last transfer where the gas detector reacts, or the intensity of the reaction is a measure of the content of contaminants.

6 Claims, 1 Drawing Figure

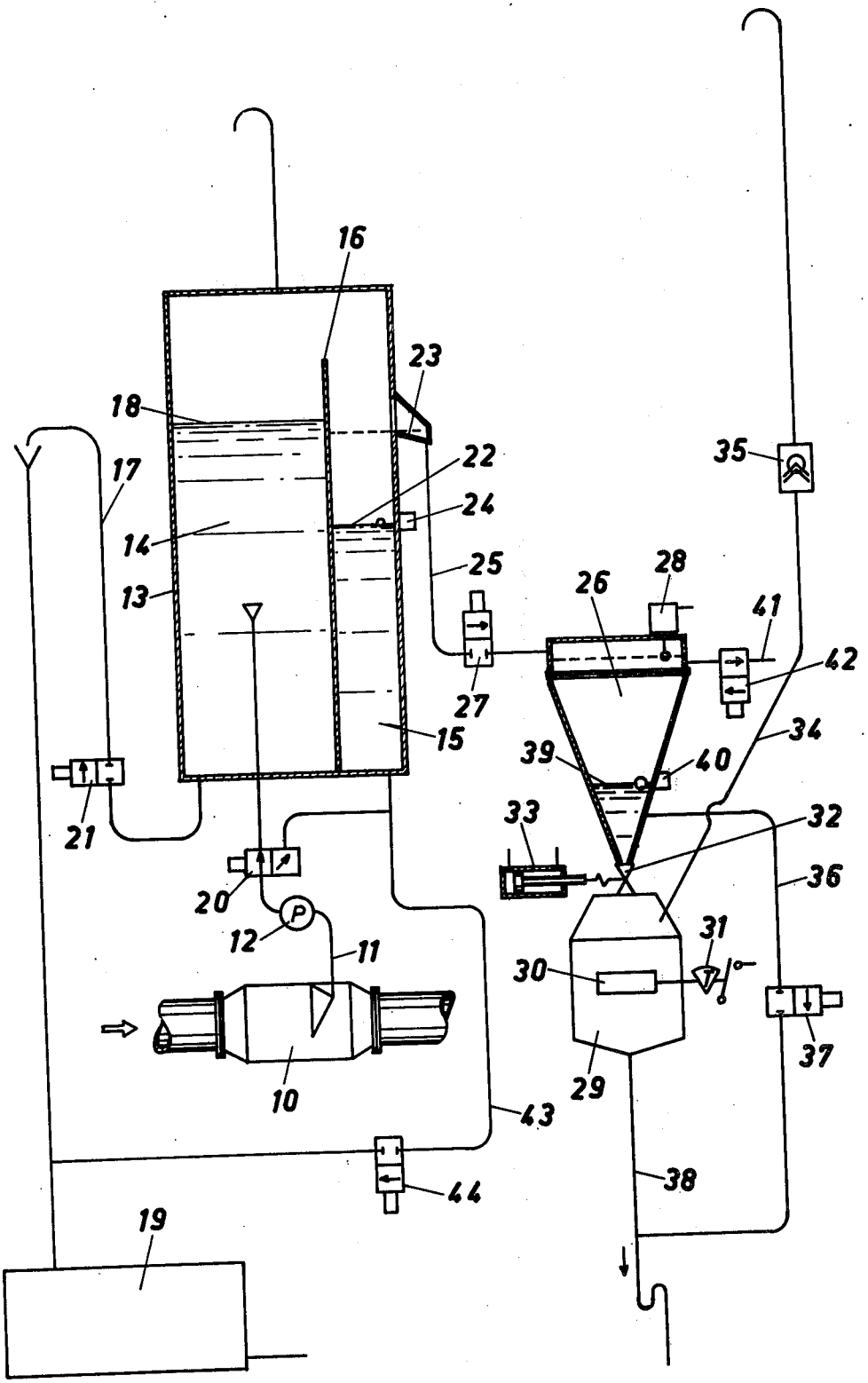

METHOD AND A DEVICE FOR DETECTING CONTAMINANTS IN PROCESS WATER

BACKGROUND OF THE INVENTION

Contaminations, especially of oil, in process water will often cause troubles if they are not detected in time. A field where the risk of oil fouling of water is highly imminent, is cargo heating systems for tank ships. The different cargo tanks are provided with heating coils sunk into the liquid cargo and heated by means of steam. This will condense in the coil and the condensate will be returned to the boiler to be transferred to steam once again.

Even an unsignificant crack in a coil will permit oil from the cargo to enter the heating system. This oil finally reaches the boiler, where it will form encrustations upon the water tubes and disturb the circulation in general.

In order to obtain a rapid indication of a possible presence of oil in the condensate, a fraction thereof is continuously divided off from the condensate return pipe and is subjected to a settling procedure in order to obtain a residue enriched with the oil, possibly contained in the divided off fraction.

This residue is transferred into a chamber provided with a heating means and connected to a gas detector. If the residue contains substantially pure water only, this will be turned into steam and at least partly condensed without the gas detector being activated, whereas, if the residue contains oil, a smoke is formed which makes the gas detector react.

The invention refers to a method of detecting the presence of contamination in process water, as well as an apparatus for determining such contaminants.

SUMMARY OF THE INVENTION

The method is characterized in continuously dividing off a fraction of a body of water flowing through a conduit, subjecting the fraction to a settling procedure comprising at least one step in which a top layer is separated as a residue by way of a weir, and introducing this residue, during an extended period of time, into a chamber provided with a heating means and connected to a gas detector.

A device according to the invention includes a settling tank for receiving the divided-off fraction, means for transferring the top layer of said fraction to a receiver, a chamber located below said receiver and containing a heating means for transferring liquid from the receiver to the chamber, and a gas detector connected to the chamber.

BRIEF DESCRIPTION OF THE DRAWING

The attached drawing very schematically shows the basic components of a plant according to the invention as used for monitoring the condensed water supply of the cargo heating system in a ship.

DESCRIPTION OF A PREFERRED EMBODIMENT

The drawing shows those components only, which are necessary for explaining the invention, and it is evident that a plant in practical use will include a number of flow paths and valves for governing the same. The intention is that the system shall be monitored according to a pre-determined program, so transfer of fluid from one step to the following will occur at predetermined intervals.

This monitoring can be brought about in a number of ways and has by itself no bearing upon the basic concept of the invention.

The condensate flowing from the cargo heating coils is by way of a conduit 10 conveyed back to a steam boiler (not shown). A fraction of the condensate is continuously divided off through a branch conduit 11, and is by way of a pump 12 transferred to a tank 13. This is divided into two compartments, 14 and 15, by means of a partition, the upper edge of which forms a weir between the two compartments.

An outlet conduit 17 from compartment 14 is arranged in such a manner that a constant water level 18 is maintained in the compartment as long as the inlet and the outlet are open. The outlet conduit is connected to a filter tank 19, and from the latter the water is transferred back to the process.

A two-way valve 20 is fitted between pump 12 and tank 13, and in the outlet conduit 17 there is a further valve 21.

After a pre-determined time valve 21 is closed and the level in compartment 14 is momentarily raised until it reaches the weir 16. During a further period of time the pump will supply water to compartment 14, whereby the top layer therein will flow over to compartment 15. Valve 21 is then opened and the level within compartment 14 will sink to level 18.

The quantity of water divided off through conduit 11 is known, and experience tells how long time possible oil contaminants in the water will require to rise to the surface. It therefore is comparatively easy to calculate the closing and opening times for valve 21.

After a certain number of such over-flow operation the level within compartment 15 has risen to value 22. Valve 20 will then be shifted, so pump 12 during a short period will deliver water directly to compartment 15. The level therein will then rise, and a portion of the liquid therein will flow over a weir 23, whereafter valve 20 is returned to its normal position and the pump again delivers water to compartment 14. Compartment 15 will simultaneously be emptied through a conduit 43 provided with valve 44, so the unseparated water used for transferring of the residue contained in compartment 14 will be emptied to filter tank 19. The draining of compartment 15 may be included in the monitoring program, but level 22 may also be sensed by a switching device 24.

From weir 23 the liquid is transferred by way of a conduit 25 to a funnel shaped receiver 26. A valve 27 is provided in this conduit, and is normally maintained in closed position. It will however, receive an impulse to open simultaneously with valve 20 being shifted for delivery to compartment 15. A further impulse will reset it simultaneously with last mentioned valve.

Receiver 26 has sufficient volume to be able to receive a number of transfers from compartment 15, and will serve as a last settling step. The highest level within the same is sensed by means of a device 28, which, when activated, starts processing of the liquid contained within the receiver.

Below the latter there is a chamber 29 provided with heating means 30. This heating means includes an obliquely located plate, which by means of a thermostat 31 is maintained at a temperature of between 250° and 350°C. A connection between the receiver and the chamber is governed by means of valve 32, which by a servo motor 33 may be brought into different positions in a manner to be described herebelow. Chamber 29 is further, by means of a ventilating pipe 34, connected to a gas detector 35 of arbitrary known type designed to react when fog or smoke appears in pipe 34.

An outlet conduit 36 is connected to the lower end of the receiver, and is provided with a valve 37. This conduit is connected to a further outlet conduit 38 from chamber 29.

It is pre-supposed that valve 32 normally is closed. After a number of transfers from compartment 15 the level within the receiver will reach a value to activate the level sensing device 28. This will open valve 37 and block valve 27, so no further transfer from compartment 15 will occur during the time necessary to evacuate receiver 26. By means of conduit 36 the level within the receiver 26 is reduced to value 39, whereafter valve 37 is closed. The latter level is sensed by a device 40, but the time necessary for reducing the level down to this value may be included in the program.

A compressed air conduit 41 is connected to the upper end of receiver 26. This conduit is provided with a valve 42, which on the one hand is a common shut-off, deaerating valve, and on the other hand, governed by a oscillator when brought into a certain position, will issue a series of short pressure air pulses within the receiver.

When the level within the receiver has been reduced to value 39 only a small volume of liquid will be retained therein, which will include at least a major portion of possible oil contaminants in the water divided off through conduit 11. Valve 32 is now, by means of servo motor 33, brought into a first position in which it opens a very restricted, narrow slot-formed passage between receiver 26 and chamber 29.

Also within the small residue now present in the receptacle the oil will rise to the top. Due to the different surface tension characteristics of oil and water, respectively, water will start to dribble onto plate 30, where it will immediately be transferred into steam. This steam will condense within the chamber, or in conduit 34, and the water will flow out through conduit 38, without causing any activity at the gas detector 35. The compressed air pulses from valve 42 will aid in this drop-wise transfer.

When a small quantity remains in receiver 26 valve 32 is suddenly opened fully and the remaining fluid gushes over the plate, and a rapid rise of steam occurs. If this fluid still is water only the gas detector will not be activated. The actual quantity of fluid may be about 10 ml.

If a major oil leak has occurred it is possible that generation of smoke will occur already during the time when valve 32 is open in its first position, i.e., when the liquid still dribbles down. The time between the opening of valve 32 and an activity at the gas detector 35 will then be a measure of the quantity of oil in the water. If the gas detector reacts just when the valve is shifted to its second position it is possible to estimate the quantity of oil by measuring the intensity of the reaction.

During normal use, pure water will be treated only, and as soon as the divided-off residue has passed valve 32 the apparatus is brought into action again, and receiver 26 is ready to take a new batch.

The steps necessary to take, if and when the gas detector shows any reaction, has by itself no influence upon the understanding of the invention, and may be of manual or automatic type.

In addition to cargo heating systems the invention may be utilized for monitoring the feed water supply to other types of steam boilers or process water in general, where there is a risk of contamination by matter which has a lower gravity than water, or is soluble therein, for instance chemicals of various kinds.

I claim:

1. A method of detecting the presence of contaminants such as oil and gasoline in process water, which comprises continuously dividing off a fraction of a body of water flowing through a conduit, subjecting the fraction to a settling procedure comprising at least one step in which a top layer is separated as a residue by way of a weir, and introducing this residue, during an extended period of time, into a chamber provided with a heating means and connected to a gas detector which reacts in the presence of smoke produced by the contact of contaminants contained in said residue with said heating means.

2. The method according to claim 1, in which the residue is collected in a receiver being connected to the chamber by way of a valve, arranged in one position to permit a restricted flow between the receiver and the chamber, and, in a second position, to permit a more open flow and simultaneously to distribute the passing fluid over the heating means.

3. A device for detecting the presence of contaminants in process water comprising in combination means for continuously dividing off a fraction of the body of water, a settling tank for receiving the divided-off fraction, means for transferring the top layer of said fraction as a residue from the settling tank to a receiver, a chamber located below said receiver, means for transferring liquid from the receiver to the chamber, a heating means in the chamber, and a gas detector connected to the chamber, said detector providing a reaction in the presence of smoke produced by the contact of contaminants contained in said residue with said heating means.

4. The device according to claim 3, in which the means for transferring liquid from the receiver to the chamber includes a valve designed in one position to provide a restricted passage between the receiver and the chamber, permitting a flow by drops only to the heating means, and in a second position to permit a heavier flow and simultaneously a spraying of the fluid over the heating means.

5. The device according to claim 4, in which a compressed air conduit is connected to the receiver, a valve in said conduit being arranged, when the transfer valve between the receiver and the chamber remains in its first position, to issue short pulses of compressed air into the receiver in order to augment the drop-wise transfer of fluid to the chamber.

6. The device according to claim 4, in which the settling tank comprises two separate compartments communicating by way of a first weir, the downstream compartment being connected to the receiver by means of a second weir, first valve means being provided for intermittent transfer of the top layer from the first compartment to the second compartment, and second valve means being provided for intermittent transfer from the downstream compartment to the receiver.

* * * * *